United States Patent
Bayer et al.

[11] Patent Number: 5,837,205
[45] Date of Patent: Nov. 17, 1998

[54] BYPASS SYSTEM AND METHOD FOR REGENERATIVE THERMAL OXIDIZERS

[75] Inventors: Craig E. Bayer, Orange, Calif.; Edward G. Blazejewski, Green Bay, Wis.

[73] Assignee: Megtec Systems, Inc., DePere, Wis.

[21] Appl. No.: 643,901

[22] Filed: May 7, 1996

[51] Int. Cl.$^6$ .................................................. F01N 3/10
[52] U.S. Cl. .................. 422/109; 422/173; 422/175; 422/176; 431/5; 431/7; 431/170; 110/190; 110/211; 110/345
[58] Field of Search .................................. 422/176, 171, 422/109, 173, 177, 175, 170, 182, 198; 110/211, 245, 345, 190; 431/5, 7, 170

[56] References Cited

U.S. PATENT DOCUMENTS

| | | | |
|---|---|---|---|
| 3,870,474 | 3/1975 | Houston | 422/171 |
| 4,126,419 | 11/1978 | Katabuchi et al. | 422/109 |
| 4,176,162 | 11/1979 | Stern | 423/210 |
| 4,267,152 | 5/1981 | Benedick | 422/111 |
| 4,302,426 | 11/1981 | Benedick | 422/173 |
| 4,426,360 | 1/1984 | Benedick | 422/173 |
| 4,650,414 | 3/1987 | Grenfell | 431/5 |
| 4,961,908 | 10/1990 | Pennington et al. | 422/175 |
| 5,024,817 | 6/1991 | Mattison | 422/111 |
| 5,422,077 | 6/1995 | Bayer | 422/109 |

*Primary Examiner*—Hien Tran
*Attorney, Agent, or Firm*—Mitchell D. Bittman; Kevin S. Lemack

[57] ABSTRACT

A regenerative thermal oxidizer in which contaminated air is first passed through a hot heat-exchange bed and into a communicating high temperature oxidation (combustion) chamber, and then through a relatively cool second heat exchange bed. The apparatus includes a number of internally insulated, ceramic filled heat recovery columns topped by an internally insulated combustion chamber. From the combustion chamber, the air flows vertically downward through another column containing heat exchange media, thereby storing heat in the media for use in a subsequent inlet cycle when the flow control valves reverse. Temperature is sensed within the bed of heat exchange media in order to monitor the temperature profile and control a bypass of hot combustion gases should the temperature exceed a predetermined level.

5 Claims, 2 Drawing Sheets

BYPASS SYSTEM AND METHOD FOR REGENERATIVE THERMAL OXIDIZERS

BACKGROUND OF THE INVENTION

The control and/or elimination of undesirable impurities and by-products from various manufacturing operations has gained considerable importance in view of the potential pollution such impurities and by-products may generate. One conventional approach for eliminating or at least reducing these pollutants is by oxidizing them via incineration. Incineration occurs when contaminated air containing sufficient oxygen is heated to a temperature high enough and for a sufficient length of time to convert the undesired compounds into harmless gases such as carbon dioxide and water vapor.

In view of the high cost of the fuel necessary to generate the required heat for incineration, it is advantageous to recover as much of the heat as possible. To that end, U.S. Pat. No. 3,870,474 (the disclosure of which is herein incorporated by reference) discloses a thermal regenerative oxidizer comprising three regenerators, two of which are in operation at any given time while the third receives a small purge of purified air to force out any untreated or contaminated air therefrom and discharges it into a combustion chamber where the contaminants are oxidized. Upon completion of a first cycle, the flow of contaminated air is reversed through the regenerator from which the purified air was previously discharged, in order to preheat the contaminated air during passage through the regenerator prior to its introduction into the combustion chamber. In this way, heat recovery is achieved.

U.S. Pat. No. 4,302,426 discloses a thermal regeneration anti-pollution system which adjusts for excessive temperatures in the high temperature incineration or combustion zone. To that end, the temperature in the combustion zone is sensed, and when a predetermined high temperature is reached therein, the gases that normally would be passed through the heat exchange bed are instead bypassed around the bed, are combined with other gases that have already been cooled as a result of their normal passage through a heat exchange bed, and are exhausted to atmosphere.

However, basing the bypass operation on the temperature sensed in the combustion or high temperature zone is somewhat inefficient, and can result in undesirable heat spikes.

It is therefore an object of the present invention to improve the efficiency of such regenerative thermal oxidizers and of the bypass operation in particular.

It is a further object of the present invention to reduce or eliminate heat spikes in such apparatus.

SUMMARY OF THE INVENTION

The problems of the prior art have been solved by the present invention, which provides a regenerative thermal oxidizer in which a gas such as contaminated air is first passed through a hot heat-exchange bed and into a communicating high temperature oxidation (combustion) chamber, and then through a relatively cool second heat exchange bed. The apparatus includes a number of internally insulated, ceramic filled heat recovery columns in communication with an internally insulated combustion chamber. Process air or gas is fed into the oxidizer through an inlet manifold containing suitable valving, preferably pneumatic poppet type valves. The air is then directed into the heat exchange media which contains "stored" heat from the previous recovery cycle. As a result, the process air is heated to oxidation temperatures within the heat exchange media, thereby resulting in oxidation of the contaminated air or process gas. Oxidation of the contaminated air within the heat exchange media is referred to as "in bed combustion". If any of the contaminated air is not completely oxidized within the heat exchange media, then the oxidation process is completed in the combustion chamber, where means for a continued heating of the flow takes place. The gas is maintained at the operating temperature for an amount of time sufficient for completing destruction of the VOC's. Heat released during the oxidation process acts as a fuel to reduce the required burner output. If the heat released by oxidation of the solvent in the contaminated air stream is below that required for self-sustaining operation, then supplemental heat is provided by heat sources located in the combustion chamber. From the combustion chamber, the air flows vertically downward through another column containing heat exchange media, thereby storing heat in the media for use in a subsequent inlet cycle when the flow control valves reverse. The resulting clean air is directed via an outlet valve through an outlet manifold and released to atmosphere at a slightly higher temperature than inlet, or is recirculated back to the oxidizer inlet. Temperature is sensed not only in the combustion chamber but also within the heat exchange media, and when an abnormally high temperature is so sensed therein, gases in the combustion chamber are bypassed around the heat-exchange bed and can be mixed with gases that have already been cooled as a result of their normal passage through a heat-exchange bed.

DETAILED DESCRIPTION OF THE INVENTION

Figure 1:
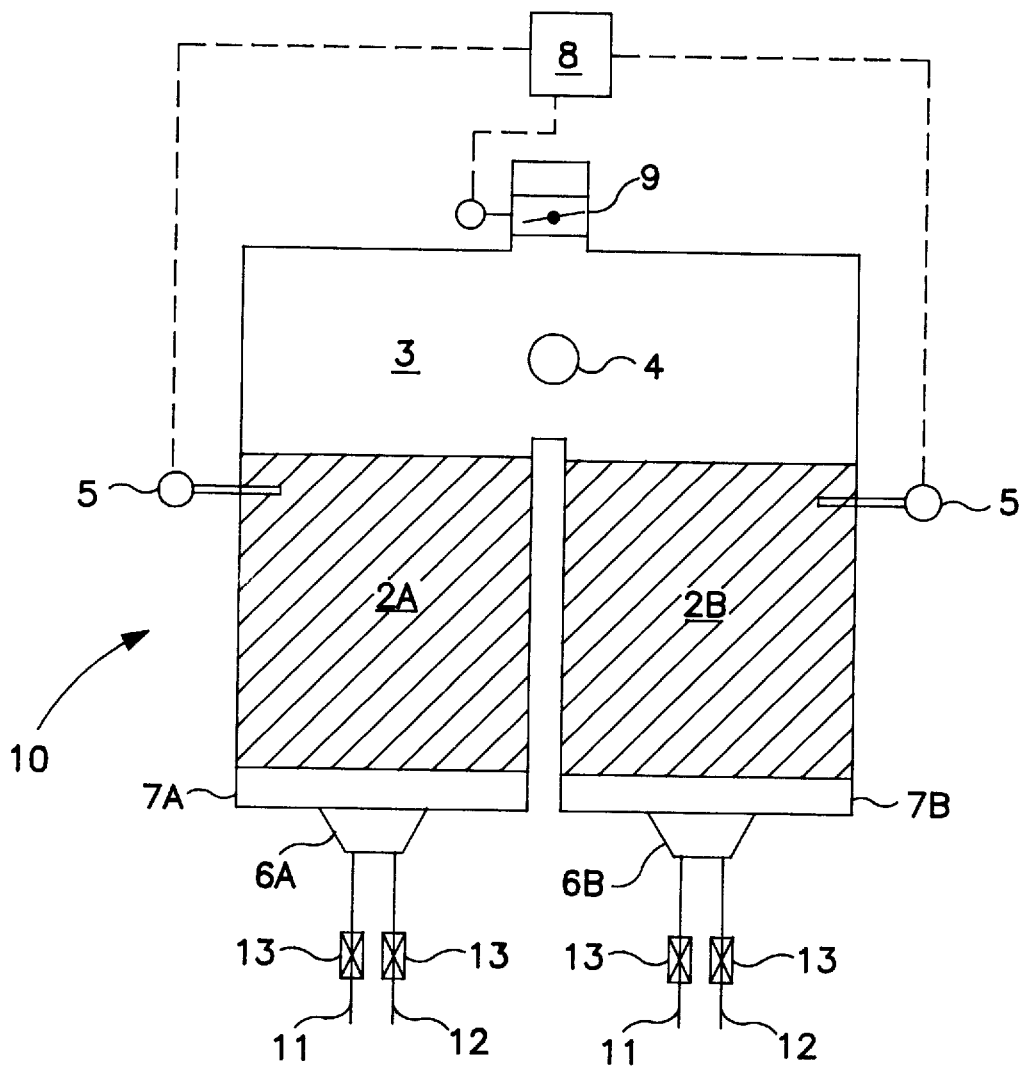
FIG. 1 is a schematic view of regenerative apparatus, including the combustion chamber and sensing means in accordance with the present invention.

In the destruction of volatile organic compounds (VOC), there are a multitude of intermediate reactions which occur in the oxidation (breakdown) of the VOC into carbon dioxide and water vapor. The last step in the reaction chain is the breakdown of carbon monoxide to carbon dioxide, with the conversion of carbon monoxide to carbon dioxide accounting for one third of the total VOC heat release. In turn, the breakdown of carbon monoxide to carbon dioxide begins at 1350° F. to 1400° F. and requires adequate time for completion. The degree to which the oxidation of a VOC occurs within the stoneware bed in a regenerative thermal oxidizer is a function of the VOC type, the VOC reaction rate, the bed temperature and retention time, and mixing, within the bed. Historically, with an oxidation temperature set point of 1500° F., the portion of the hot end of the stoneware bed where oxidation may begin is not at a high enough temperature for a sufficiently long enough time to allow complete oxidation to occur. Consequently, the majority of the oxidation reaction and the associated energy (i.e. heat) that is liberated as a result of oxidation takes place in the combustion chamber. The result of this heat liberation can be seen by an increase in the combustion chamber temperature and a reduction in the combustion chamber burner fuel input.

At a traditional combustion chamber temperature of 1500° F., the majority of the VOC oxidation reaction occurs in the chamber, and the heat liberated from that oxidation heats the air flow in the chamber. At a VOC level above that necessary for self-sustaining oxidation, the air temperature in the chamber exceeds the 1500° F. set point and the burner modulates closed and shuts off. Temperature continues to rise above the 1500° F. set point and consequently, a hot side bypass is required, which maintains the 1500° F. temperature by derating the oxidizer thermal efficiency by diverting a portion of the oxidized flow away from the stoneware.

Accordingly, the present invention uses higher combustion chamber temperatures (1600°–1700° F.) and forces most if not all of the VOC oxidation reaction to take place in the stoneware. The heat liberated from the exothermic reaction of the VOC will heat up the cooler mass that it is in contact with, which no longer is the air flow mass in the combustion chamber, but rather is the much larger and much cooler mass of stoneware having a much larger heat capacity than air. As a result, the combustion chamber temperature will remain relatively constant while the mass of stoneware is absorbing the heat and broadening its temperature profile. By broadening of the stoneware temperature profile, the thermal efficiency of the oxidizer is derated, and thus the oxidizer self-regulates its thermal efficiency as VOC levels increase above self-sustaining level. There is a realistic limiting factor to the level of VOC above self-sustaining that can be accommodated in this manner, and this is determined by a number of variables including: heat exchanger thermal efficiency, exhaust temperature, materials of construction, switch time, pressure drop, etc. For example, for a heat exchanger thermal efficiency of 95%, an optimum solvent limit of 8.0% lower explosion limit (LEL) is chosen. Above this 8.0% LEL solvent level, the oxidizer utilizes a hot side bypass in order to control temperature. A knowledge of the behavior of the temperature profile in the stoneware media can be used to monitor solvent levels and for levels greater than 8.0% LEL to control the operation of the hot side bypass. This temperature profile is obtained from the temperature sensing means located in the stoneware in accordance with the present invention.

Turning first to FIG. 1, there is shown schematically a regenerative thermal oxidizer 10 comprised of two heat exchange beds 2A, 2B; a combustion chamber 3 having at least one burner 4; inlet plenums to each bed 7A and 7B; and aperture openings 6A and 6B to each plenum. Each bed 2A, 2B has gas inlet means 11, gas outlet means 12, and valve means 13 associated therewith. Temperature sensing means 5 such as thermocouples are located in the stoneware bed. The particular location of the thermocouples is not absolutely critical; they can be located six inches, twelve inches, eighteen inches, twenty-four inches below the top of the media, for example. Preferably the thermocouples are placed from about 12 to 18 inches below the top of the media as shown. Each temperature sensing means 5 is electrically coupled to control means 8. A hot bypass duct/damper 9 receives a signal from the control means 8 that modulates the damper to maintain a temperature as measured by the temperature sensing means 5 to a predetermined set point. Those skilled in the art will appreciate that the actual set point used depends in part on the actual depth of the temperature sensing means in the stoneware, as well as on the combustion chamber set point. A suitable set point is in the range of from about 1600° F. to about 1650° F.

Figure 2:
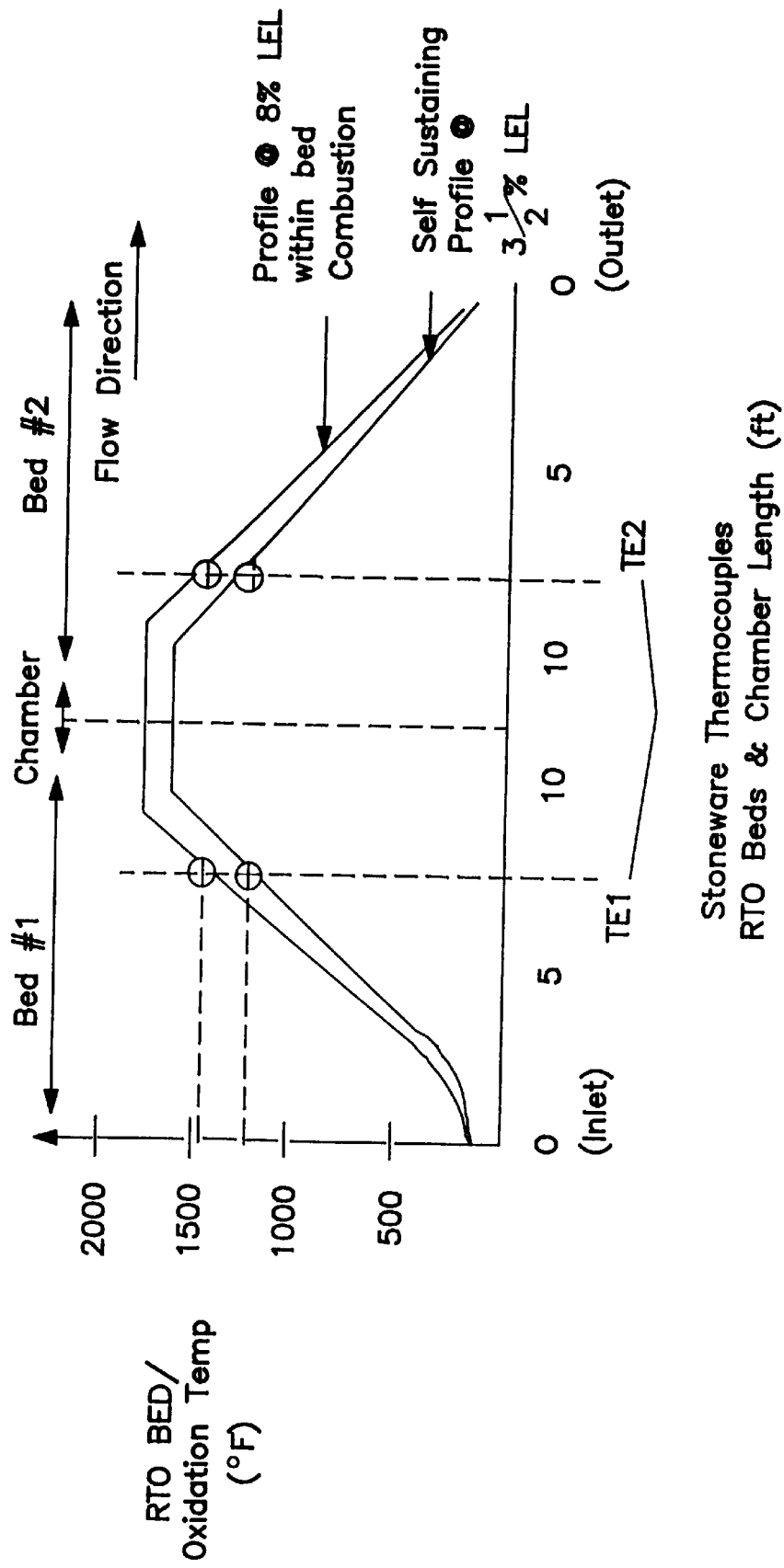
FIG. 2 is a temperature profile of an oxidizer in accordance with the present invention.

FIG. 2 illustrates the temperature profile of a typical two column oxidizer in accordance with the present invention. The temperature in the stoneware of each oxidizer bed is monitored with thermocouples TE1 and TE2. For example, with a 95% thermal efficient heat exchanger, a self-sustaining profile is achieved at a solvent level of 3.5% LEL.

Preferably the thermal oxidizer regenerative system of the present invention consists of two regenerative columns. As larger units are required to handle larger feed stream volumes, the number of columns can be increased. In the event the feed stream volume is too large for a two column system, an additional system (with a combustion chamber) can be added and used in conjunction with the first system to meet the requirements. The regenerative apparatus of the present invention can handle almost all size requirements, from about 5000 standard cubic feet per minute ("SCFM") to about 60,000 SCFM, by employing two columns. Applications requiring larger than 60,000 SCFM can be handled with multiple units.

By varying the amount of heat exchange media contained in the columns, thermal efficiencies (T.E.'s) of 85%, 90% or 95% can be obtained. For example, an 85% T.E. unit will have an approximate heat exchange media bed depth of four and one half feet; a 90% T.E. unit will have a six and one half foot bed depth, and a 95% T.E. unit will have an eight and one half foot bed depth. Standard operating temperatures of 1600°–1700° F. are preferred, although design temperature of 1800°–2000° F. or higher can be accommodated.

At high solvent loads once the burner is proven off, the combustion chamber temperature is allowed to rise above a predetermined temperature set point and is monitored only. With in-bed combustion taking place, the thermocouples located in the stoneware bed monitor the solvent level via the resulting change of the temperature profile. If the solvent load is sufficiently high (i.e., greater than 8% LEL), then the hot gas bypass is controlled (modulated) based on the temperature sensed in the stoneware ceramic beds, not based on the combustion chamber temperature as in the prior art to achieve the necessary degree of heat exchanger derating. Monitoring bed temperature rather than combustion chamber temperature assures that the bed temperature is maintained sufficiently high to achieve complete solvent oxidation within the bed (simply using combustion chamber temperature as the control point could cause the bed temperature to be too cold for high degrees of hot bypass, thereby sacrificing the required level of solvent destruction in the bed). In addition, allowing in-bed combustion to occur means that the amount of hot gas bypass required (if required) will be less than conventional technology, thereby allowing the oxidation unit to accommodate even higher LELs. Both the control and maximum amount of hot bypass is therefore a function of the minimum allowable stoneware bed temperature measured at a precise location in the hot end of the bed.

If the maximum allowable amount of hot gas bypass is achieved per the allowable stoneware bed temperature control set point, and if the solvent content is still sufficiently high, then ambient dilution air is introduced as the final control mechanism to sustain acceptable oxidizer operation. A maximum allowable hot end stoneware bed temperature will control the amount of dilution air introduced.

A high temperature safety shutdown of 2000° F. as measured by bulk combustion chamber temperature will shutdown the oxidizer to protect it from over temperature.

What is claimed is:

1. A regenerative oxidizer system for purifying a gas, comprising:

a plurality of regenerator columns, each of said columns comprising heat exchange media;

gas inlet means in communication with each of said plurality of regenerator columns;

gas outlet means in communication with each of said plurality of regenerator columns;

a combustion chamber in communication with each of said plurality of regenerator columns;

means in said combustion chamber for generating heat;

valve means in communication with said gas inlet means and said gas outlet means for alternately directing said gas into the inlet means of one of said plurality of columns in a first direction and through another of said plurality of columns in a second direction;

temperature sensing means disposed in each of said regenerator columns amongst said heat exchange media for sensing a predetermined temperature therein; and means coupled to said temperature sensing means and to said combustion chamber for extracting a portion of said gas from said combustion chamber when said temperature sensing means senses said predetermined temperature.

2. The regenerative oxidizer system of claim 1, wherein said means for generating heat comprises a burner.

3. The regenerative oxidizer system of claim 1, wherein said valve means comprise pneumatic poppet valves.

4. A process for controlling the temperature of gases in a regenerative thermal apparatus, said regenerative thermal apparatus including at least two stationary heat-exchange zones in communication with a combustion chamber, each zone containing heat exchange media, said gases normally flowing into one of said stationary heat-exchange zones upon leaving said combustion chamber, said process comprising:

a. sensing the temperature of said gases amongst said heat-exchange media in one of said heat-exchange zones;

b. in response to said sensed temperature, extracting a portion of said gases from said combustion chamber so that said gases bypass the other of said heat-exchange zones.

5. The process of claim 4 wherein said heat exchange media in said one of said heat exchange zones has a top surface, and wherein said temperature is sensed in said one of said heat-exchange zones at a position from about 12 inches to about 18 inches from said top surface of said heat exchange media in said zone.

* * * * *